(12) United States Patent
Ulrich

(10) Patent No.: US 7,426,843 B2
(45) Date of Patent: Sep. 23, 2008

(54) ROLL ASSEMBLY FOR A PIPE EXTRUSION PLANT

(75) Inventor: Herbert Ulrich, Emsdetten (DE)

(73) Assignee: Krauss-Maffei Kunststofftechnik GmbH, Müchen (DE)

( * ) Notice: Subject to any disclaimer, the term of this patent is extended or adjusted under 35 U.S.C. 154(b) by 184 days.

(21) Appl. No.: 11/287,938

(22) Filed: Nov. 28, 2005

(65) Prior Publication Data

US 2006/0078641 A1    Apr. 13, 2006

Related U.S. Application Data

(63) Continuation of application No. PCT/EP2004/004361, filed on Apr. 24, 2004.

(30) Foreign Application Priority Data

May 28, 2003 (DE) ................................ 103 24 187

(51) Int. Cl.
B29C 53/08 (2006.01)

(52) U.S. Cl. ................. 72/6.2; 425/362; 425/367; 425/392; 425/325; 72/20.5; 72/28.1

(58) Field of Classification Search ................. 425/325, 425/343, 362–367, 392–393; 72/6.2, 20.5, 72/28.1
See application file for complete search history.

(56) References Cited

U.S. PATENT DOCUMENTS

| 3,958,913 A | | 5/1976 | Stangl | |
|---|---|---|---|---|
| 4,073,859 A | * | 2/1978 | Baumgartner et al. | 425/392 |
| 4,468,187 A | * | 8/1984 | Nilsson et al. | 425/363 |
| 4,863,365 A | * | 9/1989 | Ledoux et al. | 425/343 |
| 5,092,756 A | * | 3/1992 | Gau et al. | 425/343 |
| 5,580,589 A | * | 12/1996 | Stoves et al. | 425/392 |

FOREIGN PATENT DOCUMENTS

| AT | 400 549 B | 1/1996 |
|---|---|---|
| DE | 15 54 876 A | 1/1970 |
| DE | 196 45 832 | 8/1997 |
| DE | 198 43 340 | 4/2000 |
| JP | 2001 287258 | 10/2001 |

* cited by examiner

Primary Examiner—Yogendra Gupta
Assistant Examiner—Thu Khanh T Nguyen
(74) Attorney, Agent, or Firm—Henry M. Feiereisen; Ursula B. Day

(57) ABSTRACT

A roll assembly and a pipe extrusion plant for producing pipes with a variable diameter, includes an extruder, an adjustable calibration device, and a cooling device, whereby a pipe to be produced is guided at least in part during the production process. In order to be able to provide a guide that is suited to different pipe diameters, a roll assembly is provided to include a row of rolls which are placed one behind the other in a take-off direction, with each roll mounted in a bracket and supported to allow vertical positioning thereof in dependence on the pipe diameter.

9 Claims, 2 Drawing Sheets

ROLL ASSEMBLY FOR A PIPE EXTRUSION PLANT

CROSS-REFERENCES TO RELATED APPLICATIONS

This application is a continuation of prior filed copending PCT International application no. PCT/EP2004/004361, filed Apr 24, 2004, which designated the United States and on which priority is claimed under 35 U.S.C § 120 and which claims the priority of German Patent Application, Serial No. 103 24 187.6, filed May 28, 2003, pursuant to 35 U.S.C. 119(a)-(d), the subject matter of which are incorporated herein by reference.

BACKGROUND OF THE INVENTION

The present invention relates to a roll assembly for guiding a pipe in a pipe extrusion plant as well as to a pipe extrusion plant for production of pipes with adjustable diameter.

Nothing in the following discussion of the state of the art is to be construed as an admission of prior art.

Pipe extrusion plants are generally known. The production of plastic pipes involves initial melting of a plastic starting material in an extruder and discharge via a pipe die. The exiting thermoplastic molten tube from the pipe die is cooled under shape constraint and calibrated. Calibration is of great importance as far as pipe dimensions and tensions in the pipe wall are concerned. Plastic pipes are calibrated predominantly on the outside, whereby a vacuum calibration device is typically employed.

The still soft molten tube is drawn shortly after discharge from the die through a calibrator which is mounted in the vacuum tank. This calibrator can be configured as sleeve-type calibrator or disk-type calibrator depending on the thermoplastic material. The required contact pressure upon the calibrator is realized by the pressure differential between the normal pressure inside the pipe and the vacuum in the vacuum tank. The vacuum calibration device includes a vessel which can be sealed vacuum-tight and may be equipped preferably as cooling basin with spray nozzles. In and following the calibration path, the extruded pipes must be cooled down to such a degree as to be sufficiently stable in shape for subsequent loads (for example take-off device, winder). Cooling of the pipes may hereby be carried out in tanks with water baths or spray nozzles.

Heretofore, the production of plastic pipes with varying wall thicknesses or outer diameters required the availability of different calibration devices. As a result, the respective parts (e.g. calibrator) must be exchanged, necessitating a shutdown of the machine and causing downtimes.

German Offenlegungsschrift DE 198 43 340 C2 discloses an adjustable calibration device for different pipe dimensions. This calibration device includes a plurality of lamellae which are distributed in spaced-apart relationship about the circumference on the outer side of the pipe to be calibrated. Viewed in travel direction of the pipe, a plurality of such lamellae rims are arranged within a calibrating station, with gaps being provided between the individual lamellae of the individual lamellae rims.

The vacuum tank and the spray baths must be provided with guides to support the pipes. To date, commercially available installations use rolls and support disks to meet this task. Support disks, which have the desired pipe radius on the side facing the pipe, are normally used in the vacuum tank. The use of such support disks appears necessary because the pipe is still very unstable in this early phase and has a tendency to assume an oval shape without this guiding aid.

A drawback of a tube extrusion plant allowing the production of pipes with different diameter is however the need to also change the pipe guidance during each diameter change and the need to manually conform or exchange the guides. As the center line of a pipe should remain essentially the same for different pipes, rolls for greater pipes must be arranged lower, while rolls for smaller pipes must be elevated.

German Pat. No. DE 196 45 832 C1 discloses an apparatus for guiding extruded components, especially pipes, including a parallelogram of mountings on which rotatably supported rolls can be adjusted so as to enable a continuous centered guiding of pipes with varying diameters.

It would therefore be desirable and advantageous to provide an improved roll assembly and improved pipe extrusion plant to obviate prior art shortcomings and to allow automatic adjustment of a pipe guidance to adapt to varying pipe diameters in a simple manner while yet properly supporting the pipe during production and maintaining the pipe substantially centered.

SUMMARY OF THE INVENTION

According to one aspect of the present invention, a roll assembly for guiding a pipe in a pipe extrusion plant for producing pipes of different diameter, includes a bracket, a roll supported by the bracket, and an adjustment device for automatically positioning the roll in vertical direction in dependence on a weight load upon the roll.

The present invention resolves prior art problems by so constructing a roll as to adjust its vertical position in dependence on the weight load acting on the roll. Hereby, the invention is based on the recognition that pipes of greater diameter normally have a greater weight per meter. Thus, when the roll is loaded by a pipe of greater weight, and thus normally also of greater diameter, the roll moves further downwards than would be the case, when the weight load on the roll is smaller as a result of a smaller pipe and thus of smaller weight. Thus, when being exposed to a smaller pipe, the roll moves upwards in opposite direction. In this way, the center line for pipes of different diameter can still be maintained at substantial same vertical height in a simple manner.

The roll is rotatably mounted on an axle which is supported indirectly or directly by an elastic element that forms the adjustment device. A plurality of materials and devices known per se may be used as elastic element, such as, e.g., rubber-like elements. Currently preferred is the use of a spring, in particular a spiral spring, as elastic element, for movably supporting the axle so as to allow the roll to move downwards as a load on the roll increases. Suitably, the spiral spring has a spring hardness which is suited to a weight per meter range of the pipe which range correlates with the dimension range. Thus, the roll for guiding the pipes aligns itself spontaneously to the weight load.

According to another feature of the present invention, the roll assembly includes a plurality of such rolls which are arranged in succession, whereby the rolls may have varying roll geometries. For example, rolls may be used which correspond to a maximum pipe radius. The rolls may also be constructed in such a way as to laterally support also the smallest pipes to be produced. Such pipes are preferably arranged in the area of the vacuum tank. The subsequent spray baths may use roll geometries which are configured in the form of a double-V-block so that the pipe is guided also in this case always on both rear sides.

According to another aspect of the present invention, a pipe extrusion plant for producing pipes with different diameter includes an extruder for plasticizing a starting material to produce a melt strand, an adjustable calibration device sizing the melt strand to shape for forming a molten tube, a cooling device for cooling the tube, and a roll assembly for guiding the tube during advance through the calibration device and the cooling device, wherein the roll assembly includes a plurality of rolls arranged behind one another in a travel direction and constructed to have at least two different roll geometries, and an adjustment device for automatically positioning the rolls in vertical direction in dependence on a diameter of a pipe being produced.

By providing rolls of varying roll geometries, different support functions can be realized and varying support lines can be provided, for example a support of the pipe in the bottom area and various side areas. For example, one of the rolls may have a first roll geometry to conform to a maximum radius of a pipe being produced, and another one of the rolls may have a second geometry for lateral support of a smallest pipe to be produced.

According to another feature of the present invention, the adjustment device may be constructed to carry out the positioning of the rolls in dependence on a weight load upon the rolls. The adjustment device may hereby be implemented by an elastic element, such as a spring, e.g. spiral spring. Of course, other devices may be conceivable as well for adjusting the rolls in their vertical height. For example, the pipe diameter may be scanned by means of a sensor (e.g. laser, mechanical sensor, etc.), and a drive may be provided for the rolls (either a drive per roll or a drive for several rolls respectively) for adjusting the rolls—in dependence on the scanned diameters—in an automatic manner. Electric, hydraulic or pneumatic drives may be used as drives. However, such a control system is significantly more complex compared to the use of a spring as adjustment device because of the need for a sensor, an actuator and a control, and is thus applicable primarily, when high precision is required.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
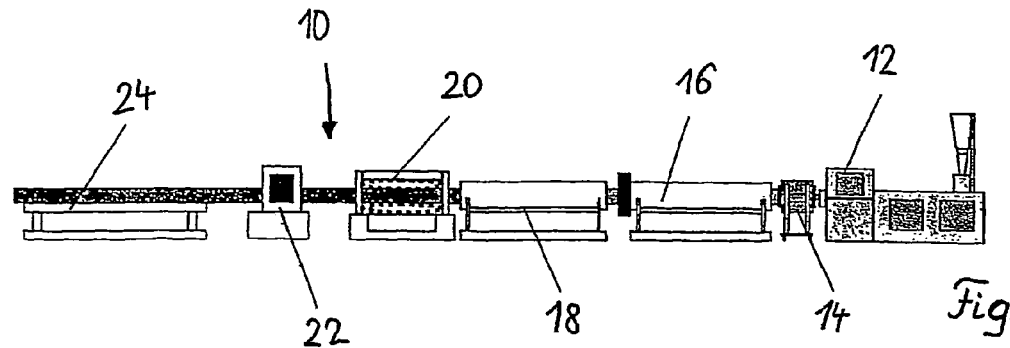
FIG. 1 shows a schematic illustration of a pipe extrusion plant having incorporated the subject matter of the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a pipe extrusion plant generally designated by reference numeral 10. The pipe extrusion plant 10 includes an extruder 12, arranged at the beginning of the pipe extrusion plant 10 for receiving starting material which is melted by the extruder 12 and discharged from the opposite end. Melt produced in the extruder 12 advances subsequently through a die 14 by which the melt is shaped to the required size. The die 14 is constructed as a variable die so that the exit gap can be adjusted to the diameter and wall thickness requirements. Exiting the die 14 is a thermoplastic tube which enters subsequently a vacuum calibration device 16. The vacuum calibration device 16 includes a cooling basin which can be sealed vacuum-tight and in which spray nozzles, not shown in more detail, are provided for cooling the molten tube. Further provided in the vacuum calibration device 16 is a calibration basket, also not shown in more detail, for shaping the molten tube to final shape. The molten tube is hereby pressed upon a disk-type calibrator as a consequence of the pressure differential between the normal pressure inside the pipe and the vacuum in the vacuum tank. The disk-type calibrator has also a variable pipe geometry which is adjusted in correspondence to set requirements for the diameter.

Following the vacuum calibration device 16, in which an initial cool down already takes place, the tubular pipe advances through a cooling device 18 where it is cooled down further by means of water baths or spray nozzles to such a degree as to have a stable shape that is maintained during subsequent processing and exposure to loads. The cooling device 18 is followed by a take-off device 20 by which the molten tube is drawn continuously and without pressure and at even speed through the calibration device 16 and the cooling tanks. The take-off force of the plant has to exceed hereby the encountered friction forces. An example of a typical take-off device 20 is a caterpillar take-off unit. Following the take-off device 20 is a separating device 22 for cutting the tube to produce pipes of same lengths which are then deposited on a delivery table 24 and from there are supplied to a storage space.

Advance of the pipe through the vacuum calibration device 16 and the cooling device 18 requires the provision of a guidance of the pipe. This is attained by the arrangement of a roll assembly according to the invention which will be described hereinafter.

Figure 2:
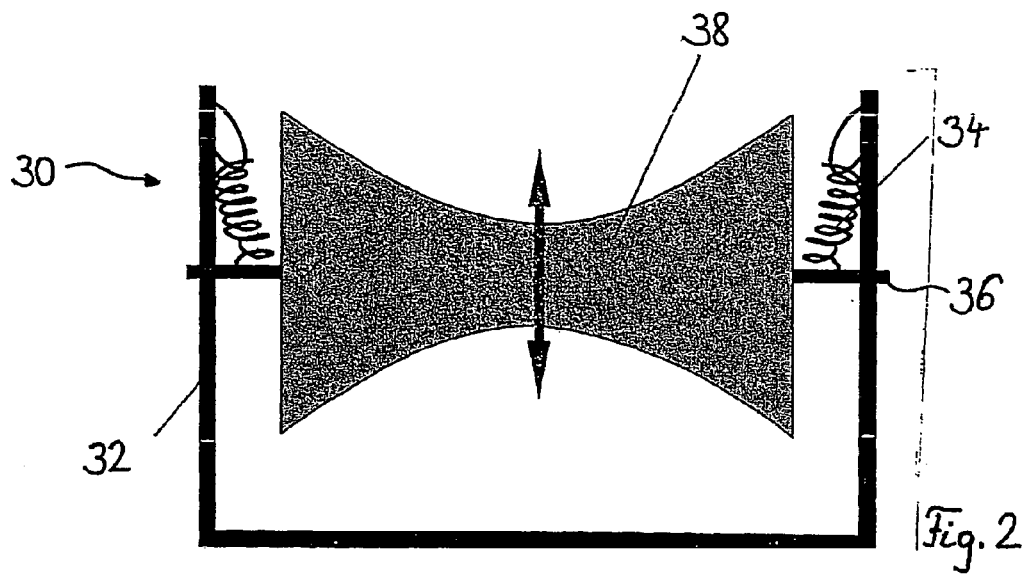
FIG. 2 shows a schematic plan view of one embodiment of a roll assembly according to the present invention installed in the pipe extrusion plant.
Figure 3:
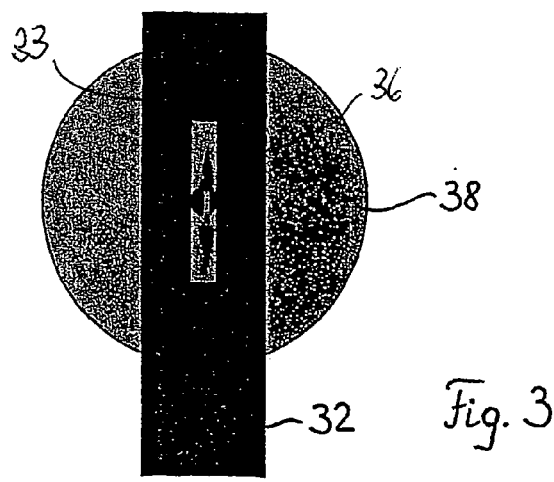
FIG. 3 shows a schematic side view of the roll assembly of FIG. 2.

Referring now to FIG. 2, there is shown a first embodiment of a roll assembly, generally designated by reference numeral 30, which is simple in structure and essentially includes a roll 38 which is rotatably mounted on an axle 36. Opposite ends of the axle 36 are movably received in two aligned oblong holes 33 (FIG. 3), which are formed in lateral legs of a U-shaped bracket 32 made of a sheet metal bar which is bent twice to receive the U-shaped configuration. The roll 38 has a surface geometry for properly supporting the pipe. Secured to both upper ends of the bracket 32 are one ends of spiral springs 34 whose other ends are secured to the axle 36. The springs 34 hold the axle 36 and thus the roll 38 in a substantial horizontal position at a level which is defined by the spring force.

Both springs 34 expand depending on the load upon the roll 38, so that the axle 36 and thus the roll 38 moves downwards in dependence on the weight load as applied by the pipe. The spring hardness or spring constant is selected to take into account the weight per meter range correlating with the dimension range. Thus, the roll 38 moves downwards in response to the respectively supported pipe such that the center line of the pipe is substantially at same height, regardless of the diameter of the pipe.

Through provision of the roll assembly 30, the pipe guidance is automatically adjusted in a very cost-efficient manner and with simple means to the differently selected diameters of a pipe to be produced. Of course, adjustment to a weight per meter may also be realized by exchanging the springs 34 or adding further elastic devices (for example further springs).

It will be appreciated by persons skilled in the art that the present invention is not limited to the arrangement of spiral springs 34 as elastic elements in order to realize an automatic positional adjustment of the rolls 38 in dependence on the pipe being produced. As an alternative to spiral springs, other elastic elements, such as leaf springs, rubber paddings etc., may be used to allow a downward movement of the axle 36 in the oblong holes 33 in response to the weight load upon the roll 38.

Figure 4:
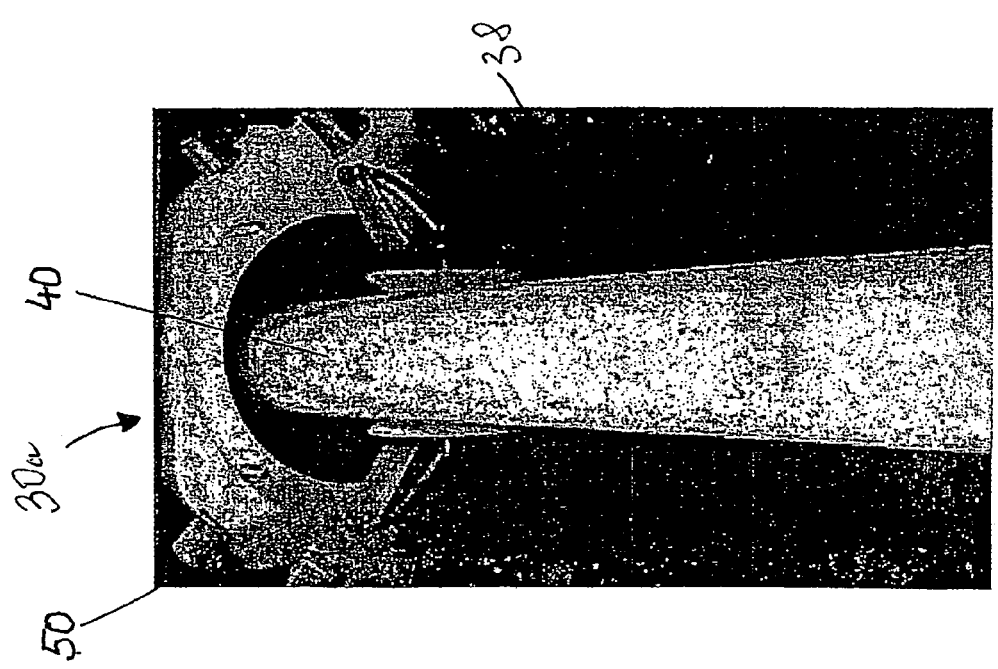
FIG. 4 shows a perspective view of another embodiment of a roll assembly according to the present invention for installation in a pipe extrusion plant.

Turning now to FIG. 4, there is shown a perspective view of another embodiment of a roll assembly according to the present invention, generally designated by reference numeral 30a for installation in a pipe extrusion plant, depicted here by way of example in the area of the cooling device 18 in opened state. Parts corresponding with those in FIG. 2 are denoted by identical reference numerals and not explained again. The description below will center on the differences between the embodiments. The roll assembly 30a is positioned immediately following the entrance of the cooling device 18 and includes a bracket 50 for attachment of one ends of two spiral springs 34 whose other ends are secured to the axle 36 for movable support of the axle 36 and the roll 38. Pipe 40 is shown here supported by the roll 38.

Figure 5:
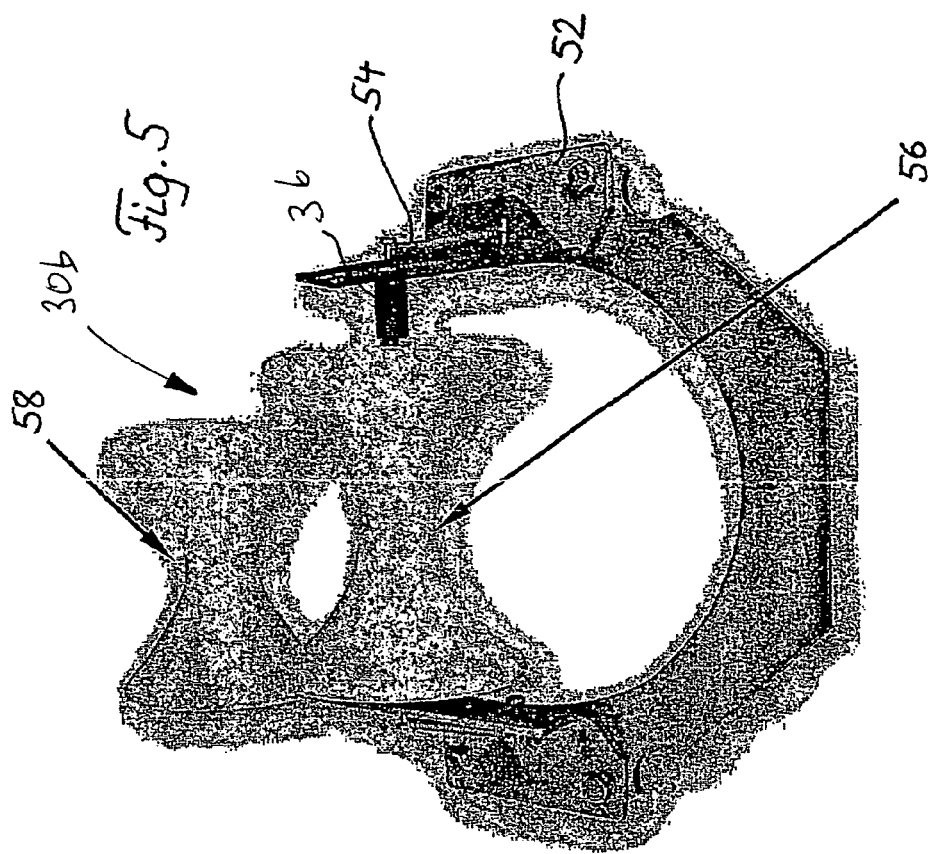
FIG. 5 shows a schematic perspective view of yet another embodiment of a roll assembly according to the present invention for installation in pipe extrusion plant.

FIG. 5 shows another embodiment of a roll assembly according to the present invention, generally designated by reference numeral 30b. The roll assembly 30b includes a bracket 52 and springs 54. A first roll 56 is here supported by axle 36. The roll 56 has a surface configuration which is constructed to allow support of a maximal possible pipe radius on its lower side. The curvature of the roll 56 in parallel relationship to the axle direction is thus selected in accordance with the greatest pipe radius or a pipe to be extruded. A second roll 58 is shown here to constitute a substitute roll and has a surface geometry which differs form the surface geometry of the roll 58 and is selected to allow lateral support of a smallest pipe. As a consequence, a pipe 40 to be extruded rests on the roll 58 at other contact points as on the roll 56.

A pipe extrusion plant 10 according to the invention can have a row of rolls arranged behind one another for establishing the pipe guidance. It is hereby possible to use alternating rolls of different surface geometry so that the pipe to be extruded can be supported by varying line points. In this way, deformation of the still fairly unstable molten tube as a result of its instability can be avoided—in particular in the area of the vacuum calibration device 16. It is no longer necessary to exchange support disks during a diameter change and to replace them by different rolls or support disk devices. The support disk function is met in the present invention by the alternating use of rolls with different surface geometry because different pipe portions can be supported.

In summary, the present invention ensures that the position of the guidance automatically conforms to the produced pipe diameter. As a consequence, manual adjusting or exchange operations are no longer needed. Of course, significantly more complex and complicated lowerable or liftable guides are possible which are covered by the scope of the present invention. For example, the diameter or the weight of a pipe may be determined via a sensor and the axle 36 of a roll 38 may be height-adjusted by a drive means in correspondence to the weight of the axle 36. Conceivable are electromotive or hydraulic drives for adjustment of the axle 36. Such subject matter—also covered by the scope of the invention—would be more cost-intensive compared to the embodiment shown by way of example.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A roll assembly for guiding pipes of different diameter in a pipe extrusion plant for producing pipes of different diameter, comprising:
    a bracket;
    a roll supported by the bracket; and
    an adjustment device for automatically positioning the roll in vertical direction in dependence on a weight load as applied by the pipe upon the roll.

2. The roll assembly of claim 1, wherein the roll is supported by an axle, said adjustment device including an elastic element for movably supporting the axle so as to allow the roll to move downwards as a load on the roll increases.

3. The roll assembly of claim 2, wherein the elastic element is a spring.

4. The roll assembly of claim 3, wherein the spring is a spiral spring.

5. The roll assembly of claim 3, wherein the spiral spring has a spring hardness which is suited to a weight per meter range of the pipe which range correlates to a pipe dimension range.

6. The roll assembly of claim 1, further comprising a plurality of said roll arranged in succession, said rolls having varying roll geometries.

7. The roll assembly of claim 1, wherein the roll has a roll geometry which corresponds to a maximum pipe radius.

8. The roll assembly of claim 6, wherein the roll geometry of the rolls is selected to laterally support the pipe to be produced which is of minimum dimension.

9. The roll assembly of claim 1, wherein the roll has a double-V-surface configuration.

* * * * *